(12) United States Patent
Wu et al.

(10) Patent No.: US 8,637,423 B2
(45) Date of Patent: Jan. 28, 2014

(54) SELECTIVE CATALYSTS HAVING HIGH TEMPERATURE ALUMINA SUPPORTS FOR NAPHTHA HYDRODESULFURIZATION

(75) Inventors: Jason Wu, Clinton, NJ (US); Edward S. Ellis, Basking Ridge, NJ (US); Valery Sokolovskii, Sunnyvale, CA (US); David Michael Lowe, Sunnyvale, CA (US); Anthony F. Volpe, Jr., Santa Clara, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 994 days.

(21) Appl. No.: 12/087,979

(22) PCT Filed: Jan. 12, 2007

(86) PCT No.: PCT/US2007/001000
§ 371 (c)(1),
(2), (4) Date: Nov. 24, 2008

(87) PCT Pub. No.: WO2007/084437
PCT Pub. Date: Jul. 26, 2007

(65) Prior Publication Data
US 2009/0321320 A1 Dec. 31, 2009

Related U.S. Application Data

(60) Provisional application No. 60/759,434, filed on Jan. 17, 2006.

(51) Int. Cl.
*B01J 21/18* (2006.01)
(52) U.S. Cl.
USPC ........... 502/180; 208/217; 502/182; 502/216; 502/220; 502/168
(58) Field of Classification Search
USPC ....................................................... 208/209
See application file for complete search history.

(56) References Cited

U.S. PATENT DOCUMENTS

| | | | |
|---|---|---|---|
| 4,132,632 A | 1/1979 | Yu et al. | |
| 5,985,136 A | 11/1999 | Brignac et al. | |
| 6,013,598 A | 1/2000 | Lapinski et al. | |
| 6,602,405 B2 | 8/2003 | Pradhan et al. | |
| 2002/0010086 A1 | 1/2002 | Plantenga et al. | |
| 2003/0173256 A1 | 9/2003 | Fujikawa et al. | |
| 2005/0139520 A1* | 6/2005 | Bhan et al. | 208/115 |
| 2006/0000751 A1 | 1/2006 | Bouchy et al. | |

FOREIGN PATENT DOCUMENTS

| | | |
|---|---|---|
| EP | 0 067 459 | 12/1982 |
| EP | 0 181 035 | 5/1986 |
| GB | 950 952 | 3/1964 |
| GB | 1334606 A | 10/1973 |
| GB | 2 189 163 A | 10/1987 |
| WO | 96/41848 A1 | 12/1996 |
| WO | 01/76741 A1 | 10/2001 |
| WO | 03/086622 A1 | 10/2003 |

OTHER PUBLICATIONS

Hiroshima, Kazutaka, Mochizuki, Takeo, Honma, Takehide, Shimizu, Takehiro, Yamada, Muneyoshi, "High HDS activity of Co-Mo/Al2O3 modified by some chelates and their surface fine structures", Applied Surface Science 121/122 (1997) pp. 433-436.

de Jong, Arthur M., de Beer, V.H.J. (San), van Veen, J.A. Rob, Niemantsverdriet, J.W. (Hans), "Surface Science Model of a Working Cobalt-Promoted Molybdenum Sulfide Hydrodesulfurization Catalyst: Characterization and Reactivity", Journal of Physical Chemistry 1996, 100, pp. 17722-17724.

Cattaneo, et al., The Relationship Between the Structure of NiMo/SiO2 Catalyst Precursors Prepared in the Presence of Chelating Ligands and the Hydrodesulfurization Activity of the Final Sulfided Catalysts, Journal of Catalysis 185, pp. 199-212, 1999.

Wang, et al., "Hydrodesulfurization of Dibenzothiophene Over Siliceous MCM-41-Supported Catalysts—I. Sulfided Co-Mo Catalysts", Journal of Catalysis, vol. 199, No. 1, Apr. 1, 2001, pp. 19-29.

* cited by examiner

*Primary Examiner* — Melvin C Mayes
*Assistant Examiner* — Colette Nguyen
(74) *Attorney, Agent, or Firm* — David M. Weisberg; Bruce M. Bordelon (57) ABSTRACT

This invention relates to a catalyst and method for hydrodesulfurizing naphtha. More particularly, a Co/Mo metal hydrogenation component is loaded on a high temperature alumina support in the presence of a dispersion aid to produce a catalyst that is then used for hydrodesulrurizing naphtha. The high temperature alumina support has a defined surface area that minimizes olefin saturation.

30 Claims, 10 Drawing Sheets

SELECTIVE CATALYSTS HAVING HIGH TEMPERATURE ALUMINA SUPPORTS FOR NAPHTHA HYDRODESULFURIZATION

CROSS REFERENCE TO RELATED APPLICATIONS

This Application claims the benefit of U.S. Provisional Application 60/759,434 filed Jan. 17, 2006.

FIELD OF THE INVENTION

This invention relates to a catalyst and method for hydrodesulfurizing naphtha. More particularly, a CoMo metal hydrodesulfurization component is loaded on a high temperature alumina support in the presence of an organic additive to produce, after sulfidation, a catalyst that is then used for hydrodesulfurizing naphtha. The high temperature alumina support has defined properties that minimize olefin saturation.

BACKGROUND OF THE INVENTION

Environmental regulations mandate the lowering of sulfur levels in motor gasoline (mogas). For example, it is expected that regulations will require mogas sulfur levels of 30 ppm or less by 2006. In many cases, these sulfur levels will be achieved by hydrotreating naphtha produced from Fluid Catalytic Cracking (FCC cat naphtha), which is the largest contributor to sulfur in the mogas pool. Since sulfur in mogas can also lead to decreased performance of catalytic converters, a 30 ppm sulfur target is desirable even in cases where regulations would permit a higher level. As a result, techniques are required that reduce the sulfur in cat naphthas while at the same time minimizing the reduction of beneficial properties such as octane number.

Conventional fixed bed hydrotreating can reduce the sulfur level of cracked naphthas to very low levels. However, such hydrotreating also results in severe octane number loss due to extensive reduction of the olefin content as well as excessive consumption of hydrogen. Selective hydrotreating processes have recently been developed to avoid significant olefin saturation and octane number loss. Unfortunately, in such processes, the liberated $H_2S$ reacts with retained olefins forming mercaptan sulfur by reversion. Such processes can be conducted at severities which produce product within sulfur regulations. However, significant octane number loss also occurs.

One proposed approach for preserving octane during sulfur removal is to modify the olefin content of the feed using an olefin-modification catalyst followed by contact with a hydrodesulfurization (HDS) catalyst (U.S. Pat. No. 6,602,405). The olefin modification catalyst oligomerizes the olefins.

One recently developed method of HDS is SCANfining which is a process developed by Exxon Mobil Corporation. SCANfining is described in National Petroleum Refiners Association paper # AM-99-31 titled "Selective Cat Naphtha Hydrofining with Minimal Octane Loss" and U.S. Pat. Nos. 5,985,136 and 6,013,598. Typical SCANfining conditions include one and two-stage processes for hydrodesulfurizing a naphtha feedstock. The feedstock is contacted with a hydrodesulfurization catalyst comprised of about 1 to about 10 wt. % $MoO_3$; and about 0.1 to abut 5 wt. % CoO; and a Co/Mo atomic ratio of about 0.1 to about 1.0; and a median pore diameter of about 60 Å to about 200 Å.

Even though SCANfining controls the degree of olefin saturation while achieving a high degree of HDS, there is still a need to improve the selectivity of the catalyst system to further reduce the degree of olefin saturation thereby further minimizing octane number loss.

SUMMARY OF THE INVENTION

This invention relates to a catalyst suitable for the hydrodesulfurization (HDS) of naphtha which is prepared by a process comprising: (i) heating an alumina precursor to a temperature above at least about 800° C. to form a high temperature alumina, impregnating the high temperature alumina with an aqueous solution of (a) a cobalt salt, (b) a molybdenum salt, and (c) at least one organic additive to form an impregnated high temperature alumina, provided that the high temperature alumina has a gamma, eta and chi alumina content less than about 50 wt. %, based on the total weight of the alumina; a median pore diameter in the range of about 100 Å to about 1000 Å; and a surface area between about 40 $m^2/g$ and about 200 $m^2/g$; (ii) drying the impregnated high temperature alumina at temperatures less than about 200° C. to form a dried impregnated high temperature alumina catalyst precursor; and (iii) sulfiding the dried impregnated high temperature alumina catalyst precursor to form a HDS catalyst, provided that the HDS catalyst or catalyst precursor is not calcined prior to sulfiding or use for HDS.

In a preferred embodiment, the HDS catalyst precursor contains from about 1 wt. % to about 8 wt. % cobalt, based on catalyst support and from about 6 wt. % to about 20 wt. % molybdenum, based on catalyst support. The HDS catalyst may further contain alpha alumina in addition to other high temperature aluminas such as delta, theta and kappa.

Another embodiment relates to a method for making a HDS catalyst, with the catalyst prepared by: (i) heating an alumina precursor to a temperature above at least about 800° C. to form a high temperature alumina; (ii) impregnating the high temperature alumina with an aqueous solution of (a) a cobalt salt, (b) a molybdenum salt, and (c) at least one organic additive to form an impregnated high temperature alumina, provided that the high temperature alumina has a gamma, eta and chi alumina content less than about 50 wt. %, based on the total weight of the alumina; a median pore diameter in the range of about 100 Å to about 1000 Å; and a surface area between about 40 $m^2/g$ and about 200 $m^2/g$; (iii) drying the impregnated high temperature alumina at temperatures less than about 200° C. to form a dried impregnated high temperature alumina catalyst precursor; and (iv) sulfiding the dried impregnated high temperature alumina catalyst precursor to form a HDS catalyst, provided that the HDS catalyst or catalyst precursor is not calcined prior to sulfiding or use for HDS.

Another embodiment relates to a method for the HDS of a naphtha having an olefin content of at least about 5 wt. %, based on the weight of the naphtha comprising: (i) contacting the naphtha with a HDS catalyst under hydrodesulfurization conditions, wherein the catalyst is prepared by heating an alumina precursor to a temperature above at least about 800° C. to form a high temperature alumina; impregnating the high temperature alumina with an aqueous solution of (a) a cobalt salt, (b) a molybdenum salt, and (c) at least one organic additive to form an impregnated high temperature alumina, provided that the high temperature alumina has a gamma, eta and chi alumina content less than about 50 wt. %, based on the total weight of the alumina; a median pore diameter in the range of about 100 Å to about 1000 Å; and a surface area between about 40 $m^2/g$ and about 200 $m^2/g$; (ii) drying the impregnated high temperature alumina at temperatures less than about 200° C. to form a dried impregnated high temperature alumina catalyst precursor; and (iii) sulfiding the dried impregnated high temperature alumina catalyst precursor to form a HDS catalyst, provided that the HDS catalyst or catalyst precursor is not calcined prior to sulfiding or use for HDS.

The HDS catalyst, when used for the HDS of naphtha, shows improved selectivity towards olefin saturation while maintaining a high level of HDS of the naphtha feed.

DETAILED DESCRIPTION OF THE INVENTION

The term "naphtha" is used to refer to the middle boiling range hydrocarbon fraction or fractions that are major components of gasoline, while the term "FCC naphtha" refers to a preferred naphtha that has been produced by the well-known process of fluid catalytic cracking. Naphthas having a middle boiling range are those have boiling points from about 10° C. (i.e., from about $C_5$) to about 232° C. (50 to 450° F.) at atmospheric pressure, preferably from about 21° C. to about 221° C. (70 to 430° F.). Producing naphtha in a FCC process without added hydrogen results in a naphtha that is relatively high in olefins and aromatics. Other naphthas such as steam cracked naphthas and coker naphthas may also contain relatively high concentrations of olefins. Typical olefinic naphthas have olefin contents of at least about 5 wt. % up to about 60 wt. %, based on the weight of the naphtha, preferably about 5 wt. % to about 40 wt. %; sulfur contents from about 300 ppmw to about 7000 ppmw, based on the weight of the naphtha; and nitrogen contents from about 5 ppmw to about 500 ppmw, based on the weight of the naphtha. Olefins include open chain olefins, cyclic olefins, dienes and cyclic hydrocarbons with olefinic side chains. Because olefins and aromatics are high octane number components, olefinic naphtha generally exhibits higher research and motor octane values than does hydrocracked naphtha. While olefinic naphthas are typically high in olefin content, they may also contain other compounds, especially sulfur-containing and nitrogen-containing compounds.

Selective Catalyst

The catalyst for the selective removal of sulfur with minimal olefin saturation from an olefinic naphtha is prepared using a high temperature alumina as a support material. High temperature aluminas are moderate to high surface area (from about 40 m$^2$/g to about 200 m$^2$/g), large pore aluminas. Alpha alumina is the most stable high temperature alumina phase as it is formed when other alumina phases are heated to sufficiently high temperatures such as temperatures in range of about 1000° C. to about 1200° C. or more. Thus alumina precursors such as boehmite or psuedoboehmite (AlO(OH)) and bayerite or gibbsite (Al(OH)$_3$) when heated to increasingly high temperatures are converted through the various alumina phases to the alpha phase. The generally accepted phase transitions associated with a temperature increase beginning with boehmite are as follows: boehmite→gamma alumina/chi alumina→delta alumina/theta alumina→alpha alumina. The phase transitions associated with a temperature increase beginning with gibbsite are as follows: gibbsite→chi alumina→kappa alumina→alpha alumina. The phase transitions associated with a temperature increase beginning with bayerite are as follows: bayerite→eta alumina→theta alumina→alpha alumina. As noted above, alpha alumina is the end phase of the heating of other alumina phases such as gamma, chi, eta, delta, kappa and theta. As used herein, high temperature alumina means alumina that contains theta, delta, kappa and alpha aluminas, and mixtures thereof with only minor amounts of gamma, chi, or eta phase alumina. The sum of gamma, chi, and eta alumina is less than about 50 wt. %, preferably less than about 30 wt. %, more preferably less than about 20 wt. %, based on the weight of the alumina. In an embodiment, the high temperature alumina contains greater than about 50 wt. % of at least one of theta, kappa, delta and alpha alumina, preferably greater than about 70 wt. %, more preferably greater than about 80 wt. %, based on the total weight of the alumina.

The high temperature aluminas according to the invention can be prepared by heating a precursor such as gamma alumina, bayerite, gibbsite and/or boehmite to a temperature greater than about 800° C. The temperature used is also a function of the nature of the starting phase as well as the time of heating, the time being controlled to achieve the desired phases. The high temperature alumina thus prepared is preferably predominantly a mixture of theta, kappa and alpha alumina, more preferably predominantly a mixture of theta and alpha alumina. By predominantly is meant that the weight of the designated component or components comprise more that about 50% of the weight of the mixture. It is also noted that heat with steaming can be used to produce the high temperature alumina. For example, steaming an alumina precursor at about 95% humidity for one hour at about 1000° C. results in a pure theta phase material. Other methods for preparing the high temperature alumina can be used, including conventional methods, provided the high temperature alumina has the described characteristics.

The alumina phases are determined by X-ray diffraction techniques. The different phases each have a characteristic X-ray diffraction pattern as determined by essential peak intensities and d-spacings. Accordingly, X-ray diffraction can be used to verify that a high temperature alumina has been made.

The high temperature alumina support is then impregnated with a mixture of (a) a cobalt salt (b) a molybdenum salt, and (c) one or more organic additives, such as organic ligands.

The cobalt and molybdenum salts used to impregnate the alumina support may be any water-soluble salt. Preferred salts include carbonates, nitrates, heptamolybdate and the like. The amount of salt is such that the alumina support will contain from about 2 wt. % to about 8 wt. % cobalt oxide (CoO), based on the weight of the support, preferably from about 3 wt. % to about 6 wt. %, and from about 8 wt. % to about 30 wt. % molybdenum oxide ($MoO_3$), preferably from about 10 wt. % to about 25 wt. %.

Organic ligands are organic additives which are hypothesized to aid in distributing the Co and Mo components on the silica support. The organic additives contain oxygen and/or nitrogen atoms and include mono-dentate, bi-dentate and poly-dentate ligands. The organic additives (ligands) may also be chelating agents. Organic ligands include at least one of carboxylic acids, polyols, amino acids, amines, amino alcohols, ketones, esters and the like. Examples of organic ligands include phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, and nitrilotriacetic acid (NTA), citric acid and urea.

The high temperature alumina supports have large pore volumes as measured by mercury porosimetry using ASTM method no. D4284 using a contact angle of about 140 degrees. The pore volumes are in the range from about 0.3 cc/g to about 1.5 cc/g, preferably about 0.5 cc/g to about 1.5 cc/g. The median pore sizes as measured by intrusion volume of mercury are in the range from about 100 Å to about 1000 Å, preferably from about 150 Å to about 1000 Å. The surface areas, as measured by the BET method using nitrogen, are in the range from about 40 $m^2/g$ to about 200 $m^2/g$, preferably from about 40 $m^2/g$ to about 150 $m^2/g$.

While not wishing to be bound to any particular theory, it is postulated that the present high temperature alumina supports with large pore diameters, when combined with organic ligands such as arginine, citric acid and urea, and low severity drying, lead to HDS catalysts having the desired selectivity towards olefin saturation while maintaining the activity of the HDS catalyst for desulfurizing the naphtha feed. The organic ligands are hypothesized to assist in producing an effective dispersion of metals throughout the alumina support which, in turn, is a factor in the increased selectivity exhibited by the present catalysts.

The high temperature alumina support may also be doped with metals from Groups 2-4 of the Periodic Table based on the IUPAC format having Groups 1-18, preferably from Groups 2 and 4. Examples of such metals include Zr, Mg, Ti. See, e.g., The Merck Index, Twelfth Edition, Merck & Co., Inc., 1996.

Catalyst Preparation and Use

High temperature alumina supports were impregnated with aqueous solutions of Co and Mo salts using conventional techniques, i.e., techniques known to those skilled in the art of hydroprocessing catalyst design, synthesis, manufacturing and/or use. The organic ligand may be added to the aqueous solution of salts prior to contact with the alumina support. One embodiment for impregnating the alumina support with metal salt is by the incipient wetness method. In this method, an aqueous solution containing metal salts and an organic additive is mixed with the support up to the point of incipient wetness using conventional techniques.

The manner of impregnation of the alumina support by metal salt may be by impregnating the alumina support with a mixture of a cobalt salt and organic ligand using incipient wetness, drying the impregnated support and then impregnating the dried support with a molybdenum salt solution or molybdenum salt solution containing organic ligand up to the point of incipient wetness. In another embodiment, the order of impregnation by cobalt salt followed by molybdenum salt may be reversed. In yet another embodiment, the support may be co-impregnated with a mixture of cobalt salt and molybdenum salt plus organic ligand to incipient wetness. The co-impregnated support may be dried and the co-impregnation process repeated. In yet another embodiment, an extruded alumina support may be impregnated with a mixture of cobalt salt, molybdenum salt and organic ligand and the impregnated support dried. This treatment may be repeated if desired. In all the above embodiments, the organic ligand may be a single ligand or may be a mixture of ligands. The impregnated alumina support isolated from the reaction mixture is heated and dried at temperatures in the range from about 50° C. to about 200° C. to form a catalyst precursor. The drying may be under vacuum, or in air, or inert gas such as nitrogen.

The dried catalyst precursor is treated with hydrogen sulfide at concentrations of from about 0.1 vol. % to about 10 vol. % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen sulfide may be used but this may extend the time required for activation. An inert carrier may be present and activation may take place in either the liquid or gas phase. Examples of inert carriers include nitrogen and light hydrocarbons such as methane. When present, the inert gases are included as part of the total gas volume. Temperatures are in the range from about 150° C. to about 700° C., preferably from about 160° C. to about 343° C. The temperature may be held constant or may be ramped up by starting at a lower temperature and increasing the temperature during activation. Total pressure is in the range up to about 5000 psig (34576 kPa), preferably about 0 psig to about 5000 psig (101 to 34576 kPa), more preferably about 50 psig to about 2500 psig (446 to 17338 kPa). If a liquid carrier is present, the liquid hourly space velocity (LHSV) is from about 0.1 $hr^{-1}$ to about 12 $hr^{-1}$, preferably about 0.1 $hr^{-1}$ to about 5 $hr^{-1}$. The LHSV pertains to continuous mode. However, activation may also be done in batch mode. Total gas rates may be from about 89 $m^3/m^3$ to about 890 $m^3/m^3$ (500 to 5000 scf/B).

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agents and include a wide variety of sulfur-containing species capable of generating hydrogen sulfide, including aliphatic, aromatic and heterocyclic compounds.

The dried catalyst is not calcined prior to either sulfiding or use for HDS. Not calcining means that the dried catalyst is not heated to temperatures above about 300° C., preferably about 200° C. By not calcining the catalyst, from about 60% to about 100% of the dispersing aid remains on the catalyst prior to sulfiding or use for HDS.

Following sulfiding, the catalyst may be contacted with naphtha under hydrodesulfurizing conditions. Hydrodesulfurizing conditions include temperatures of from about 150° C. to 400° C., pressures of from about 445 kPa to about 13890 kPa (50 to 2000 psig), liquid hourly space velocities of from about 0.1 to about 12, and treat gas rates of from about 89 $m^3/m^3$ to about 890 $m^3/m^3$ (500 to 5000 scf/B). After hydrodesulfurization, the desulfurized naphtha can be conducted away for storage or for further processing, such as stripping to remove hydrogen sulfide. The desulfurized naphtha is useful for blending with other naphtha boiling-range hydrocarbons to make mogas.

Embodiments, including preferred embodiments, are illustrated in the following examples.

Examples 1 to 5

Figure 1:
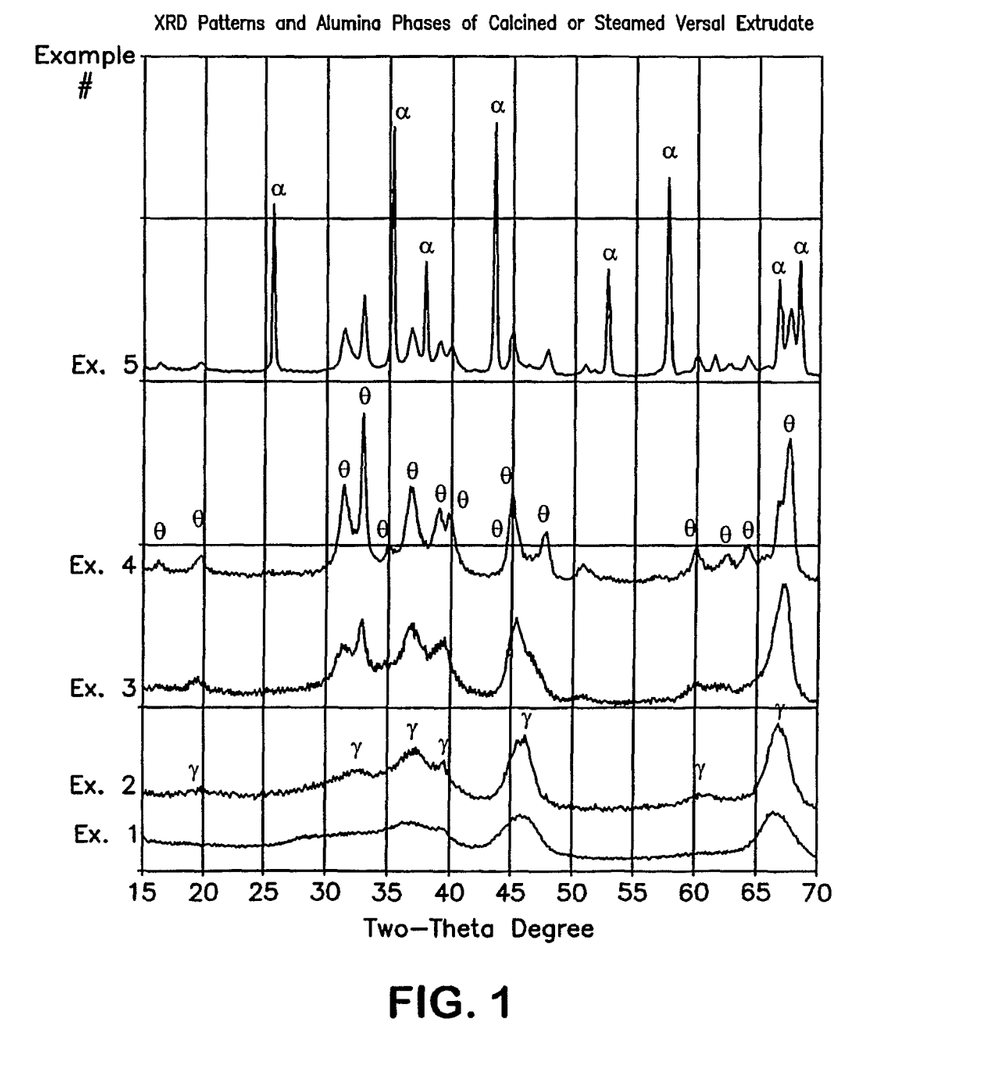
FIG. 1 is a plot of the X-ray diffraction patterns for the calcined supports of Examples 1-5.
Figure 2:
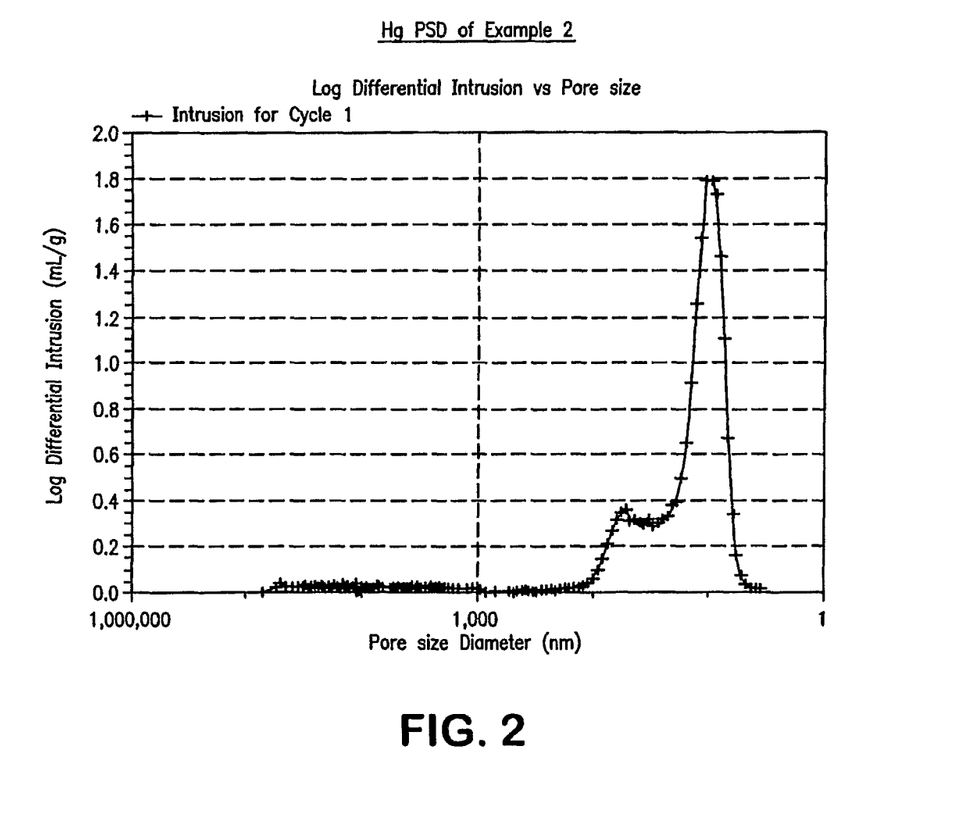
FIG. 2 is a plot showing the pore size distributions by Hg porosimetry for Example 2.
Figure 3:
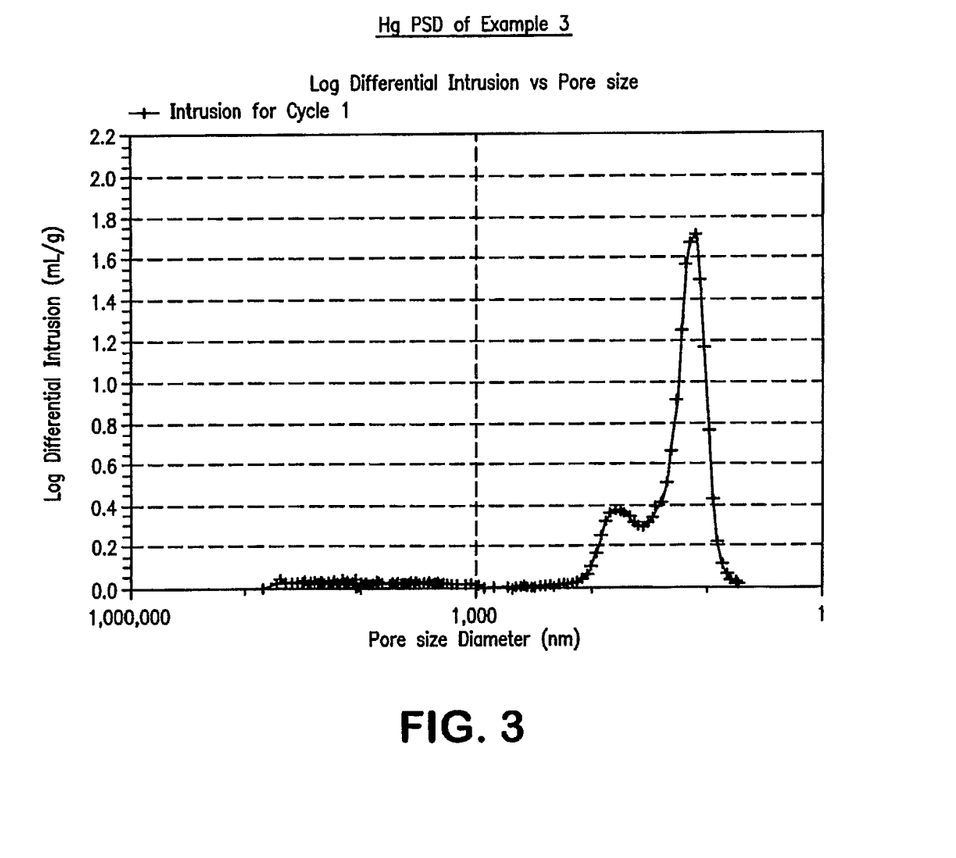
FIG. 3 is a plot showing the pore size distributions by Hg porosimetry for Example 3.
Figure 4:
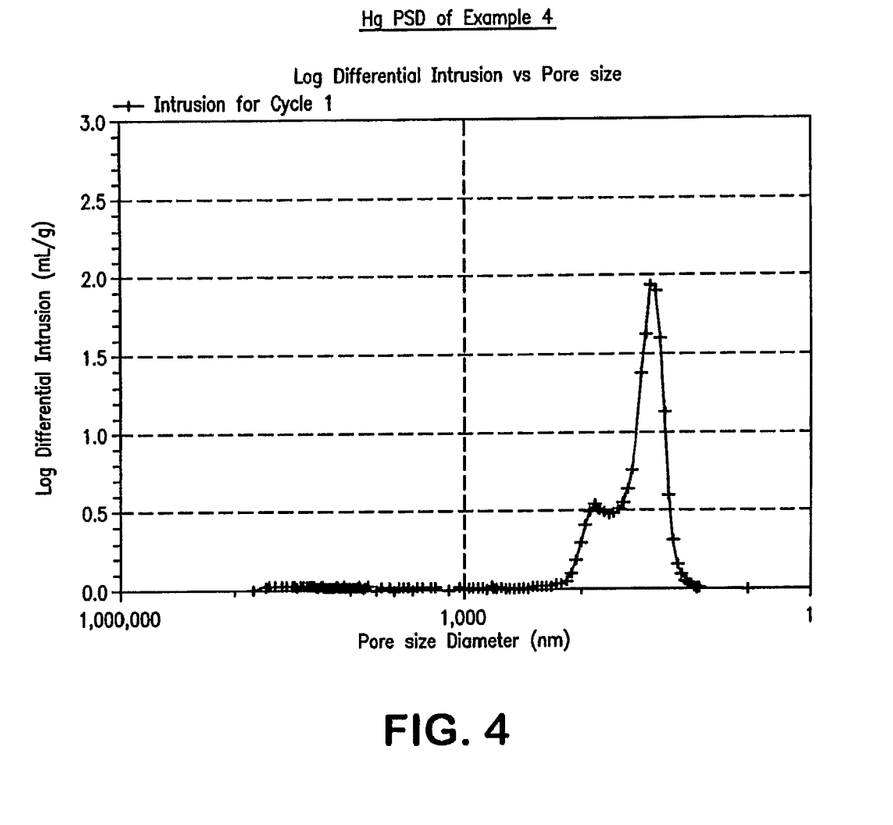
FIG. 4 is a plot showing the pore size distributions by Hg porosimetry for Example 4.
Figure 5:
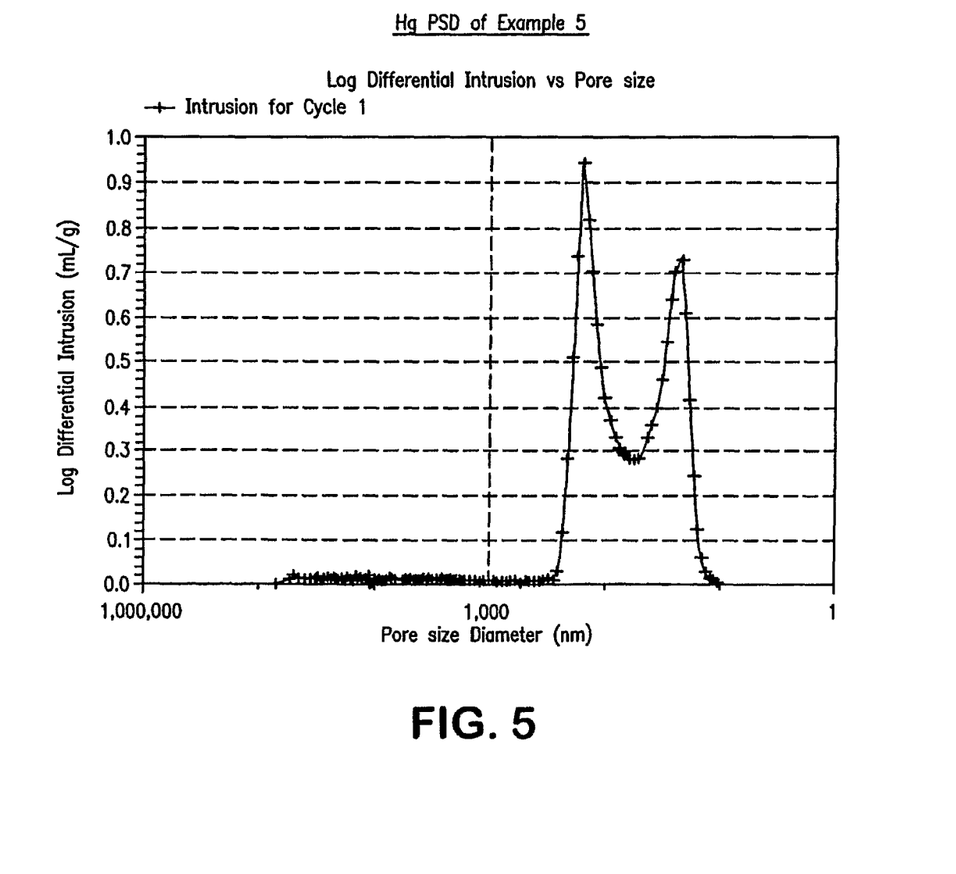
FIG. 5 is a plot showing the pore size distributions by Hg porosimetry for Example 5.

An alumina extrudate useful as a support was prepared by mixing Versal-300 (UOP) with 30% Avicel (FMC) as organic filler and 2% $HNO_3$, followed by extrusion through a 1/20" quadrilobed die. The resulting extrudate was calcined using various conditions of temperature, time, and partial steam, to produce alumina supports of Example 1 through Example 5. Specific calcination conditions, alumina phase identifications, BET surface areas by $N_2$, and pore volumes/diameters by Hg, are listed in Table 1. The XRD patterns of these calcined alumina supports are shown in FIG. 1. A copper anode was used. Intensity results are plotted vs. scattering angle (two theta). FIGS. 2 through 5 show the pore size distributions by Hg intrusion for Examples 2, 3, 4, and 5.

TABLE 1

| Exam. # | Support from Versal-300 Alumina | Alumina Phase | SA, $m^2/g$ | Hg PV, cc/g | Median Pore Diameter (by Hg Area) | Median Pore Diameter (by HG Vol.) | SC# |
| --- | --- | --- | --- | --- | --- | --- | --- |
| 1 | Versal/400° C./1 hr Calcination | γ (broad) | 340 | 0.81 | 67 | 94 | 1369 |
| 2 | Versal/800° C./8 hr Calcination | γ (pure) | 199 | 0.82 | 102 | 126 | 1371 |
| 3 | Versal/1000° C./1 hr Calcination | θ + δ | 143 | 0.75 | 143 | 175 | 1373 (1247) |
| 4 | Versal/1000° C./1 hr Steam (95%) Calcination | θ (pure) | 86 | 0.78 | 256 | 307 | 1375 |
| 5 | Versal/1100° C./10 hr. Calcination | α (major) + θ | 43 | 0.59 | 285 | 805 | 1378 |

Example 6

Figure 6:
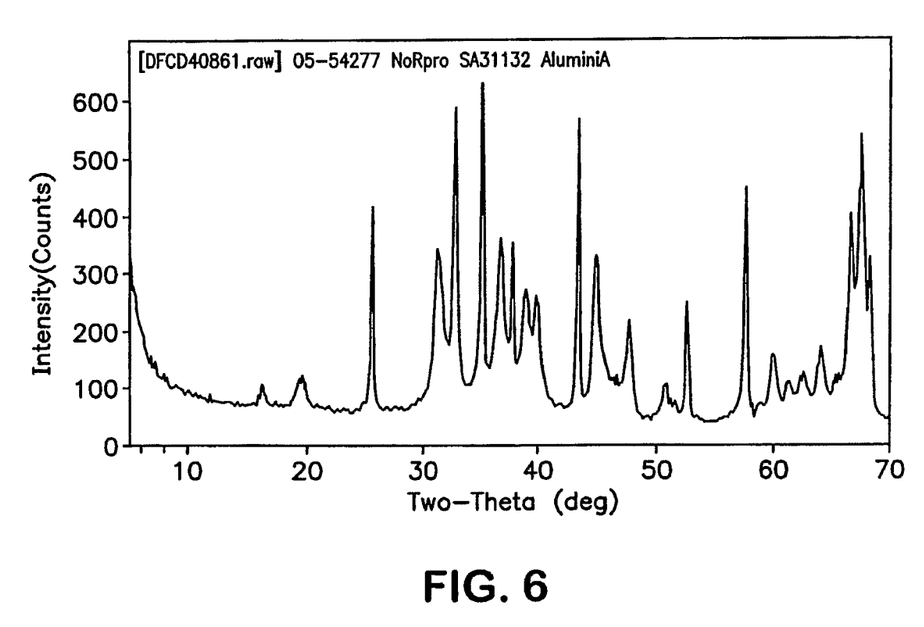
FIG. 6 is a plot of the X-ray diffraction pattern for the support for Example 6.
Figure 7:
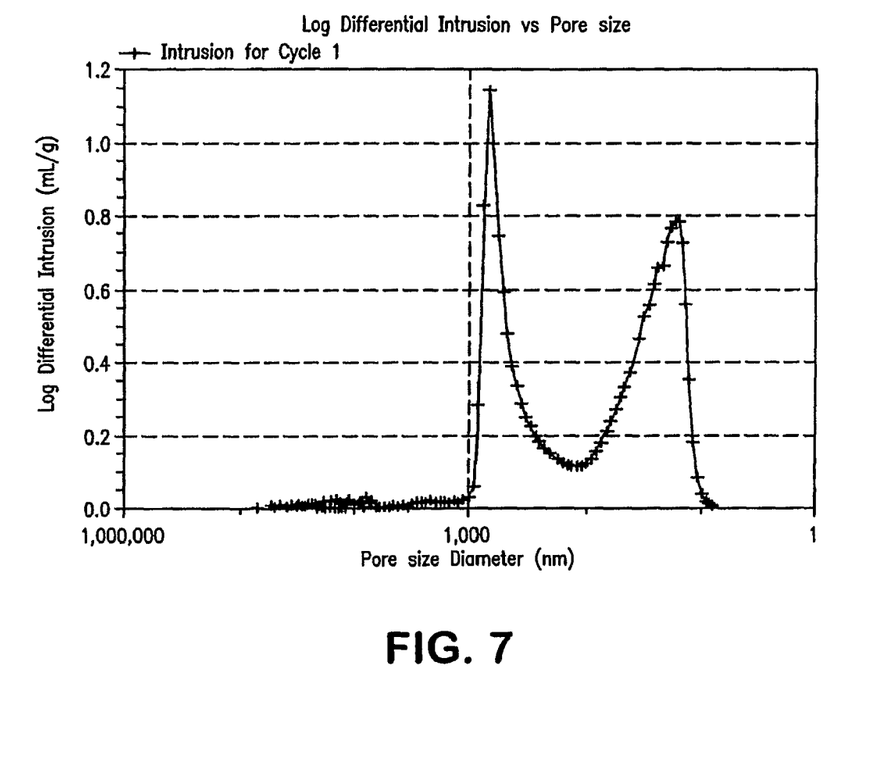
FIG. 7 is a plot showing the pore size distribution for the support of Example 6 with a median pore diameter by Hg porosimetry of 672 Å.

A commercial alumina support (Norpro SA31132) containing mixed theta and alpha alumina phases was examined by X-ray diffraction techniques as in Examples 1 through 5. FIG. 6 is a plot of the X-ray diffraction pattern for the support. FIG. 7 is a log-log plot of pore size distribution. FIG. 7 shows the pore size distribution based on HG intrusion volume. The median pore diameter determined based on mercury intrusion volume is 672 Å, while the median pore diameter determined based on pore area is 209 Å. The support has a surface area of 62 $m^2/g$ as measured by $N_2$ BET method, and pore volume of 0.77 cc/g as measured by Hg (ASTM-D4284 method). An impregnation solution was prepared by dissolving 8.34 g of urea and 4.20 g of citric acid monohydrate in 10 ml of water, followed by dissolving 2.13 g of cobalt carbonate hydrate (46.2% Co) and 6.13 g of ammonium heptamolybdate. The impregnation solution was added to the alumina support using the incipient wetness impregnation technique. The impregnated catalyst was dried at 110° C. and used in the sulfidation and HDS evaluation without calcination. The impregnated solid contained 3.9 wt. % of CoO and 15.5 wt. % $MoO_3$ on a dry basis.

Examples 7-11

The alumina supports of Examples 1-5 were impregnated with Co and Mo salts using citric acid and urea as organic additives. Impregnation and drying was carried out as described in Example 6. Table 2 lists the metal content of the dry catalyst precursors.

TABLE 2

| Example # | Support from Example # | Support SC# | $MoO_3$ | CoO |
| --- | --- | --- | --- | --- |
| 7 | 1 | 1369 | 18.1 | 4.5 |
| 8 | 2 | 1371 | 19.6 | 4.9 |
| 9 | 3 | 1373 | 16.8 | 4.2 |
| 10 | 4 | 1375 | 17.5 | 4.4 |
| 11 | 5 | 1378 | 15.5 | 3.9 |

Example 12

Catalyst precursors from Examples 6-11 were sulfided and tested in parallel with a commercially available reference CoMo/$Al_2O_3$ catalyst (RT-225) for selectivity in cat naphtha hydrodesulfurization. The catalyst precursors were sulfided using 3% $H_2S$ in $H_2$ and virgin naphtha. Feed for the catalyst evaluation was a $C_5$-177° C. (350° F.) FCC naphtha feed containing 1408 ppm 5 and 46.3% olefins. Catalysts were evaluated in an MCFB-48 unit (Multi-Channel Fixed Bed-48 Reactor) at 274° C. (525° F.) at 220 psig using $H_2$. Feed flow rate was adjusted to obtain a range of 2-methylthiophene desulfurization from 65% to 95%. Product streams were analyzed using on-line GCs and SCDs. $C_5$ Olefin content in the product was compared with $C_5$ olefin content in the feed to calculate the percentage of olefin saturation (% OSAT).

Results of % HDS and % OSAT were stable after about 30 hours of catalyst on stream, and were used to evaluate the olefin saturation (% OSAT) at various HDS conversions (% HDS).

Figure 8:
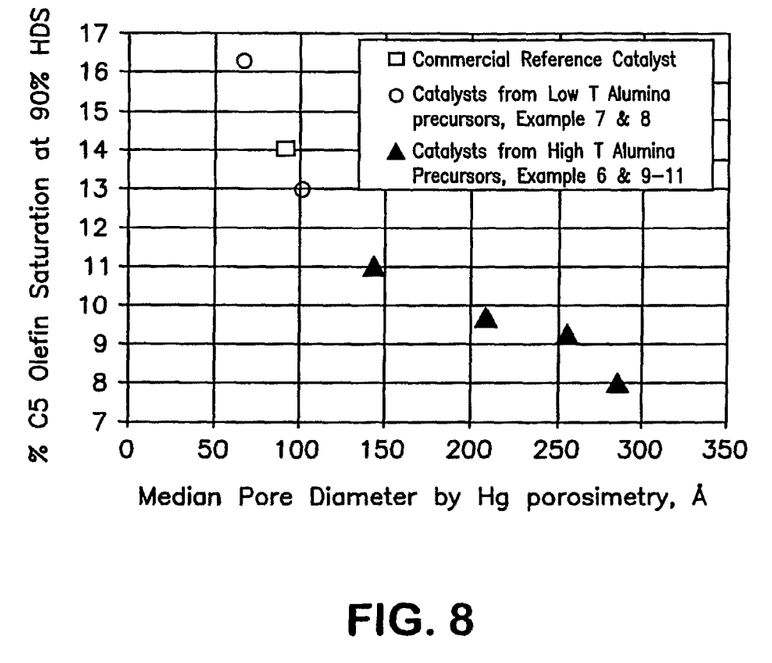
FIG. 8 is a plot showing the percentage of $C_5$ olefin saturation at 90% HDS conversion vs. the median pore diameter (based on Hg intrusion pore area) of the alumina supports used to prepare the catalysts of Example 12.

FIG. 8 plots the percentage of $C_5$ olefin saturation at 90% HDS conversion vs. the median pore diameters (based on Hg intrusion pore area) of the alumina supports used to prepare the catalysts of Example 12. A commercial catalyst, which has a median pore diameter of 90 Å, was tested under the identical conditions and showed 14 wt. % of $C_5$ olefin saturation at 90% HDS conversion. Compared to the commercial catalyst and the catalysts formed on lower temperature alumina (precursors from Examples 7 and 8), the current inventive catalysts supported on high temperature alumina have lower olefin saturation.

Figure 9:
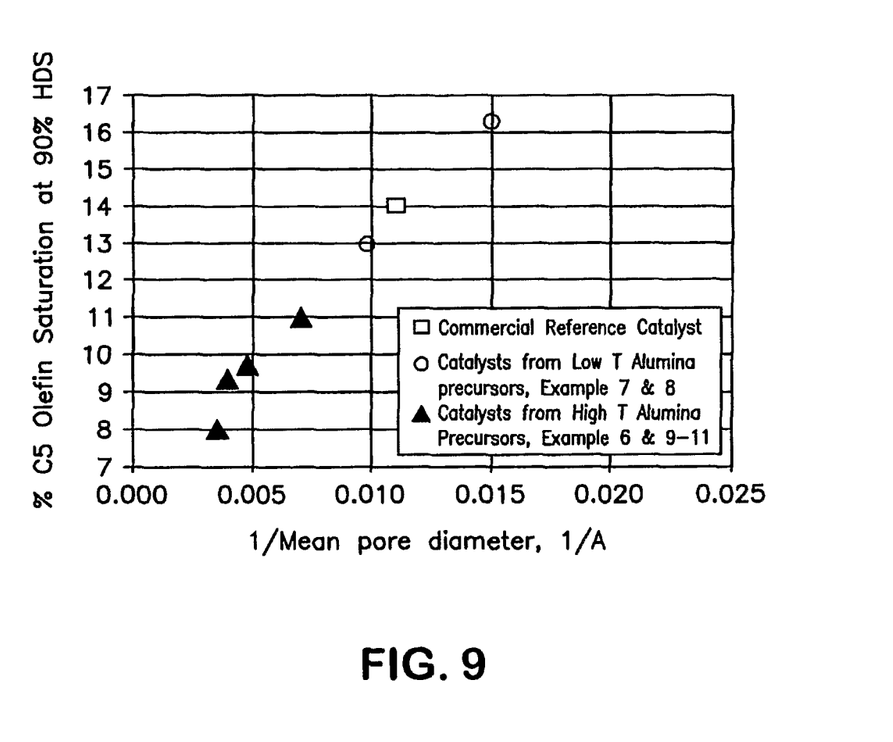
FIG. 9 is a plot showing the percentage of $C_5$ olefin saturation at 90% HDS conversion vs. (1/median pore diameter) of the alumina supports used to prepare the catalysts of Example 12.

FIG. 9 plots the percentage of $C_5$ olefin saturation at 90% HDS conversion vs. (1/median pore diameter) of the alumina supports used to prepare the catalysts of Example 12.

Figure 10:
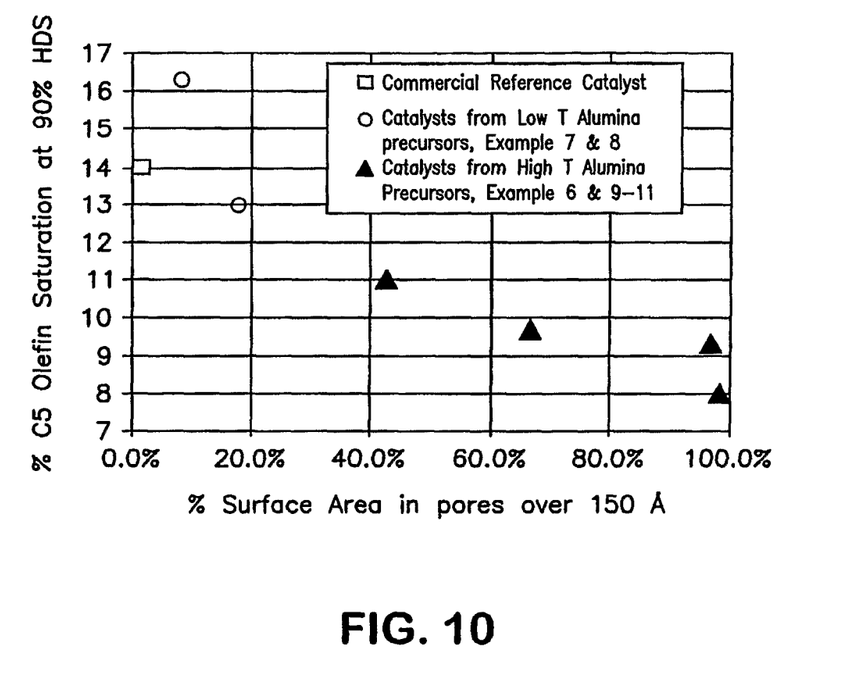
FIG. 10 is a plot showing the percentage of $C_5$ olefin saturation at 90% HDS conversion vs. percentage of surface area (measured by Hg porosimetry) larger than 150 Å for the alumina supports used to prepare the catalysts of Example 12.

FIG. 10 plots the percentage of $C_5$ olefin saturation at 90% HDS conversion vs. percentage of surface area (measured by Hg porosimetry) larger than 150 Å for the alumina supports used to prepare the catalysts of Example 12.

The invention claimed is:

1. A catalyst for the hydrodesulfurization (HDS) of naphtha which is prepared by a process comprising:
   (i) heating an alumina precursor to a temperature above at least about 800° C. to form a high temperature alumina, impregnating the high temperature alumina with an aqueous solution of (a) a cobalt salt, (b) a molybdenum salt, and (c) at least one organic additive to form an impregnated high temperature alumina, provided that the high temperature alumina has a gamma, eta and chi alumina content less than about 30 wt. %, based on the total weight of the alumina; a median pore diameter in the range of about 100 A to about 1000 A; and a surface area between about 40 m2/g and about 200 m2/g;
   (ii) drying the impregnated high temperature alumina at temperatures less than about 200° C. to form a dried impregnated high temperature alumina catalyst precursor; and
   (iii) sulfiding the dried impregnated high temperature alumina catalyst precursor to form a HDS catalyst, provided that the HDS catalyst or catalyst precursor is not calcined prior to sulfiding or use for HDS;
wherein the organic additive is an organic ligand containing oxygen and/or nitrogen atoms.

2. The catalyst of claim 1 wherein the high temperature alumina comprises at least one of theta, delta, kappa and alpha alumina.

3. The catalyst of claim 2 wherein the amount of high temperature alumina is greater than about 70 wt %ized on total alumina.

4. The catalyst of claim 3 wherein the amount of high temperature alumina is greater than about 80 wt %, based on total alumina.

5. The catalyst of claim 1 wherein the median pore diameter is from about 150 Å to about 1000 Å.

6. The catalyst of claim 1 wherein the pore volumes are in the range from about 0.3 cc/g to about 1.5 cc/g.

7. The catalyst of claim 1 wherein the surface areas are between about 40 $m^2/g$ and about 150 $m^2/g$.

8. The catalyst of claim 1 wherein the amounts of cobalt salt and molybdenum salts are sufficient to provide a catalyst support containing from about 1 wt. % to about 8 wt. % cobalt and about 6 wt. % to 20 wt. % molybdenum, based on alumina support.

9. The catalyst of claim 1 wherein the organic ligand is a mono-dentate, bi-dentate or poly-dentate ligand.

10. The catalyst of claim 9 wherein the organic ligand is at least one carboxylic acid, polyol, amino acid, amine, amide, amino alcohol, ketone or ester.

11. The catalyst of claim 10 wherein the organic ligand is at least one of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, nitrilotriacetic acid (NTA), citric acid or urea.

12. The catalyst of claim 1 wherein the catalyst precursor is dried at temperatures of from about 50° C. to about 200° C.

13. The catalyst of claim 1 wherein sulfiding of catalyst precursor may be in-situ or ex-situ in the presence of at least one sulfiding agent.

14. The catalyst of claim 13 wherein the sulfiding agent is hydrogen sulfide at concentrations of from about 0.1 vol. % to about 10 vol. %, based on total volume of gases present.

15. The catalyst of claim 1 wherein the dried catalyst precursor or sulfided catalyst is not heated to temperatures greater than about 300° C. prior to sulfiding or use for HDS.

16. A method for making the hydrodesulfurization (HRS) catalyst of claim 1, the method comprising the steps of:
   (i) heating an alumina precursor to a temperature above at least about 800° C. to form a high temperature alumina:
   (ii) impregnating the high temperature alumina with an aqueous solution of (a) a cobalt salt, (b) a molybdenum salt, and (c) at least one organic additive to form an impregnated high temperature alumina, provided that the high temperature alumina has a gamma, eta and chi alumina content less than about 30 wt. %, based on the total weight of the alumina; a median pore diameter in the range of about 100 Å to about 1000 Å; and a surface area between about 40 $m^2/g$ and about 200 $m^2/g$;
   (iii) drying the impregnated high temperature alumina at temperatures less than about 200° C. to form a dried impregnated high temperature alumina catalyst precursor; and
   (iv) sulfiding the dried impregnated high temperature alumina catalyst precursor to form a HDS catalyst, provided that the HDS catalyst or catalyst precursor is not calcined prior to sulfiding or use for HDS;
wherein the organic additive is an organic ligand containing oxygen and/or nitrogen atoms.

17. The method of claim 16 wherein the high temperature alumina comprises at least one of theta, delta, kappa and alpha alumina.

18. The method of claim 17 wherein the amount of high temperature alumina is greater than about 70 wt. %, based on total alumina.

19. The method of claim 18 wherein the amount of high temperature alumina is greater than about 80 wt. %, based on total alumina.

20. The method of claim 16 wherein the median pore diameter is from about 150 Å to about 1000 Å.

21. The method of claim 16 wherein the pore volumes are in the range from about 0.3 cc/g to about 1.5 cc/g.

22. The method of claim 16 wherein the surface areas are between about 40 $m^2/g$ and about 150 $m^2/g$.

23. The method of claim 16 wherein the amounts of cobalt salt and molybdenum salts are sufficient to provide a catalyst support containing from about 1 wt. % to about 8 wt. % cobalt and about 6 wt. % to 20 wt. % molybdenum, based on alumina support.

24. The method of claim 16 wherein the organic ligand is a mono-dentate, bi-dentate or poly-dentate ligand.

25. The method of claim 24 wherein the organic ligand is at least one carboxylic acid, polyol, amino acid, amine, amide, amino alcohol, ketone or ester.

26. The method of claim 25 wherein the organic ligand is at least one of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, nitrilotriacetic acid (NTA), citric acid or urea.

27. The method of claim 16 wherein the catalyst precursor is dried at temperatures of from about 50° C. to about 200° C.

28. The method of claim 16 wherein sulfiding of catalyst precursor may be in-situ or ex-situ in the presence of at least one sulfiding agent.

29. The method of claim 28 wherein the sulfiding agent is hydrogen sulfide at concentrations of from about 0.1 vol. % to about 10 vol. %, based on total volume of gases present.

30. The method of claim 16 wherein the dried catalyst precursor or sulfided catalyst is not heated to temperatures greater than about 300° C. prior to sulfiding or use for HDS.

* * * * *

UNITED STATES PATENT AND TRADEMARK OFFICE
CERTIFICATE OF CORRECTION

PATENT NO.         : 8,637,423 B2                                                         Page 1 of 1
APPLICATION NO. : 12/087979
DATED              : January 28, 2014
INVENTOR(S)        : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this
Twenty-second Day of September, 2015

Michelle K. Lee
*Director of the United States Patent and Trademark Office*